(12) United States Patent
Huberman

(10) Patent No.: US 10,816,343 B2
(45) Date of Patent: Oct. 27, 2020

(54) METHOD AND SYSTEM FOR DEPLOYING CROWD-SOURCED MAGNETIC DISTORTION REJECTION MAP

(71) Applicant: MAPSTED CORP., Mississauga (CA)

(72) Inventor: Sean Huberman, Guelph (CA)

(73) Assignee: MAPSTED CORP., Mississauga, Ontario (CA)

( * ) Notice: Subject to any disclaimer, the term of this patent is extended or adjusted under 35 U.S.C. 154(b) by 174 days.

(21) Appl. No.: 16/257,456

(22) Filed: Jan. 25, 2019

(65) Prior Publication Data

US 2020/0240789 A1 Jul. 30, 2020

(51) Int. Cl.
| | |
|---|---|
| *H04W 64/00* | (2009.01) |
| *G01C 21/20* | (2006.01) |
| *G01C 21/00* | (2006.01) |
| *G06K 9/00* | (2006.01) |
| *H04W 4/02* | (2018.01) |
| *G01C 21/10* | (2006.01) |

(52) U.S. Cl.
CPC ......... *G01C 21/206* (2013.01); *G01C 21/005* (2013.01); *G06K 9/00067* (2013.01); *H04W 4/02* (2013.01); *H04W 64/00* (2013.01); *G01C 21/10* (2013.01)

(58) Field of Classification Search
CPC .............. G01C 21/206; G01C 21/005; G06K 9/00067; H04W 4/02; H04W 64/00
See application file for complete search history.

(56) References Cited

U.S. PATENT DOCUMENTS

| | | | |
|---|---|---|---|
| 6,539,327 B1 | 3/2003 | Dassot et al. | |
| 9,170,112 B2 | 10/2015 | Mirov et al. | |
| 9,557,178 B2 | 1/2017 | Ghose et al. | |
| 2009/0043504 A1 | 2/2009 | Bandyopadhyay et al. | |
| 2013/0150076 A1 | 6/2013 | Kim et al. | |
| 2014/0180627 A1 | 6/2014 | Naguib et al. | |
| 2015/0018018 A1 | 1/2015 | Shen et al. | |
| 2016/0011022 A1 | 1/2016 | Zheng et al. | |
| 2016/0379074 A1 | 12/2016 | Nielsen et al. | |
| 2017/0265041 A1 | 9/2017 | Mahasenan et al. | |
| 2018/0329022 A1* | 11/2018 | Wang | G01S 5/0278 |

* cited by examiner

*Primary Examiner* — Sam Bhattacharya

(57) ABSTRACT

A method and system for deploying a magnetic distortion rejection map of an indoor area. The method comprises generating, using a processor, (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points, receiving, at the memory, a set of magnetic fingerprint data that includes a second set of magnetic distortion data points based on an additional set of positions traversed by at least one additional mobile device within the indoor area, processing the second set of magnetic distortion data points, the first distribution and the second distribution to generate an updated distribution of magnetic distortion data points, and if the updated distribution exceeds a threshold density of magnetic distortion data points, deploying the updated distribution as the magnetic distortion rejection map of the area.

20 Claims, 4 Drawing Sheets

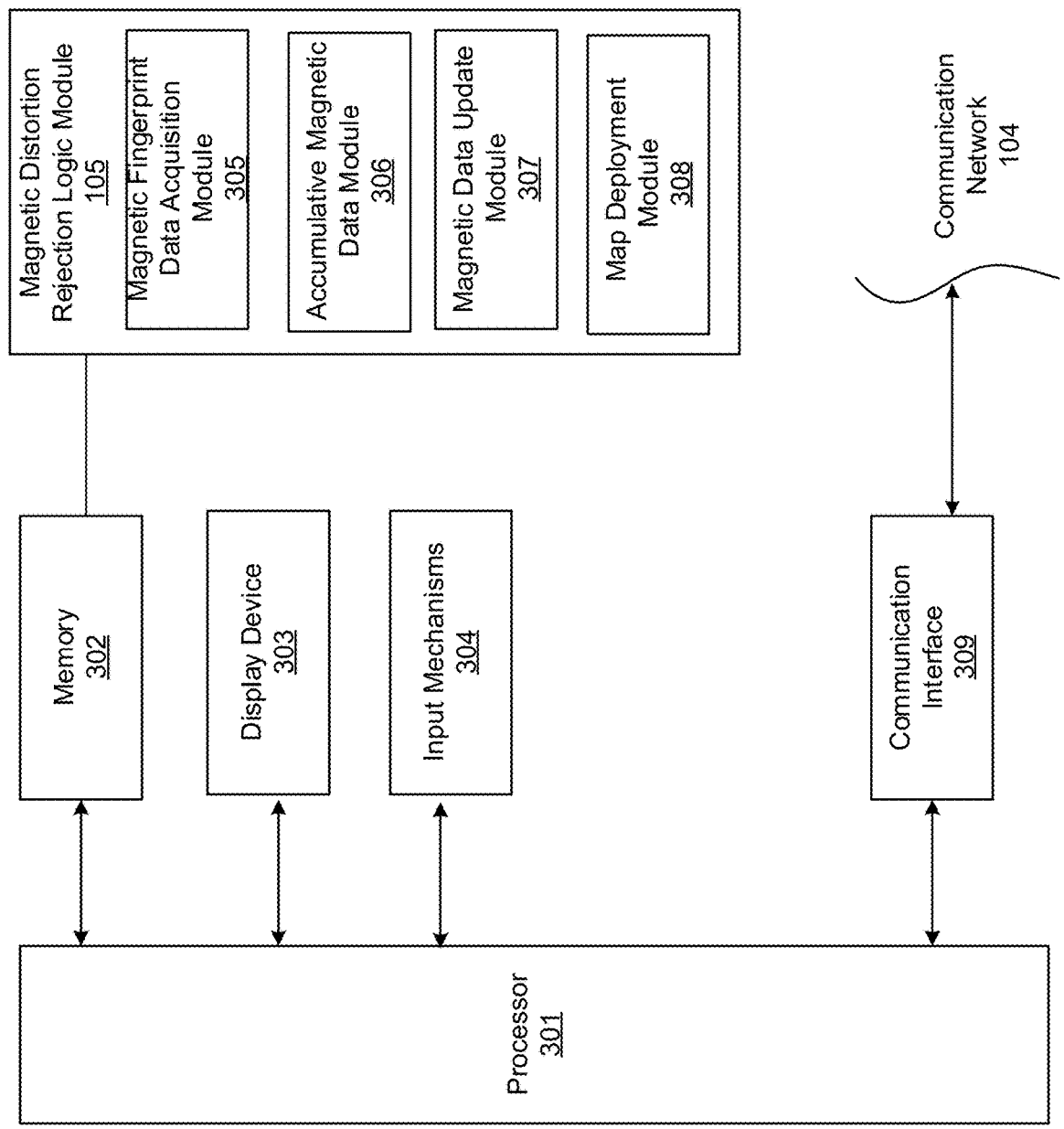

400

Generating (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points    410

Receiving a set of magnetic fingerprint data that includes a second set of magnetic distortion data points based on an additional set of positions traversed by at least one additional mobile device within the indoor area    420

Processing the second set of magnetic distortion data points, the first distribution and the second distribution to generate an updated distribution of magnetic distortion data points    430

If the updated distribution exceeds a threshold density of magnetic distortion data points, deploying the updated distribution as the magnetic distortion rejection map of the area    440

FIG. 4

METHOD AND SYSTEM FOR DEPLOYING CROWD-SOURCED MAGNETIC DISTORTION REJECTION MAP

TECHNICAL FIELD

The disclosure herein relates to the field of mobile device navigation and positioning.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, universities and industrial warehouses. To address this problem, indoor navigation solutions increasingly rely on sensors including accelerometers, gyroscopes, and magnetometers which may be commonly included in mobile phones and other mobile devices. Wireless communication signal data, ambient barometric data, mobile device inertial data and magnetic field data may be measured applied in localizing a mobile device along a route traversed within indoor infrastructure that may include infrastructure features that may distort a magnetic field to different degrees at different positions within a building.

BRIEF DESCRIPTION OF THE DRAWINGS

FIG. 3 illustrates an example architecture of a server computing device for generating and deploying a magnetic distortion rejection map of an indoor area.

FIG. 4 illustrates, in an example embodiment, a method of operation in deploying a magnetic distortion rejection map of an indoor area.

DETAILED DESCRIPTION

Figure 1:
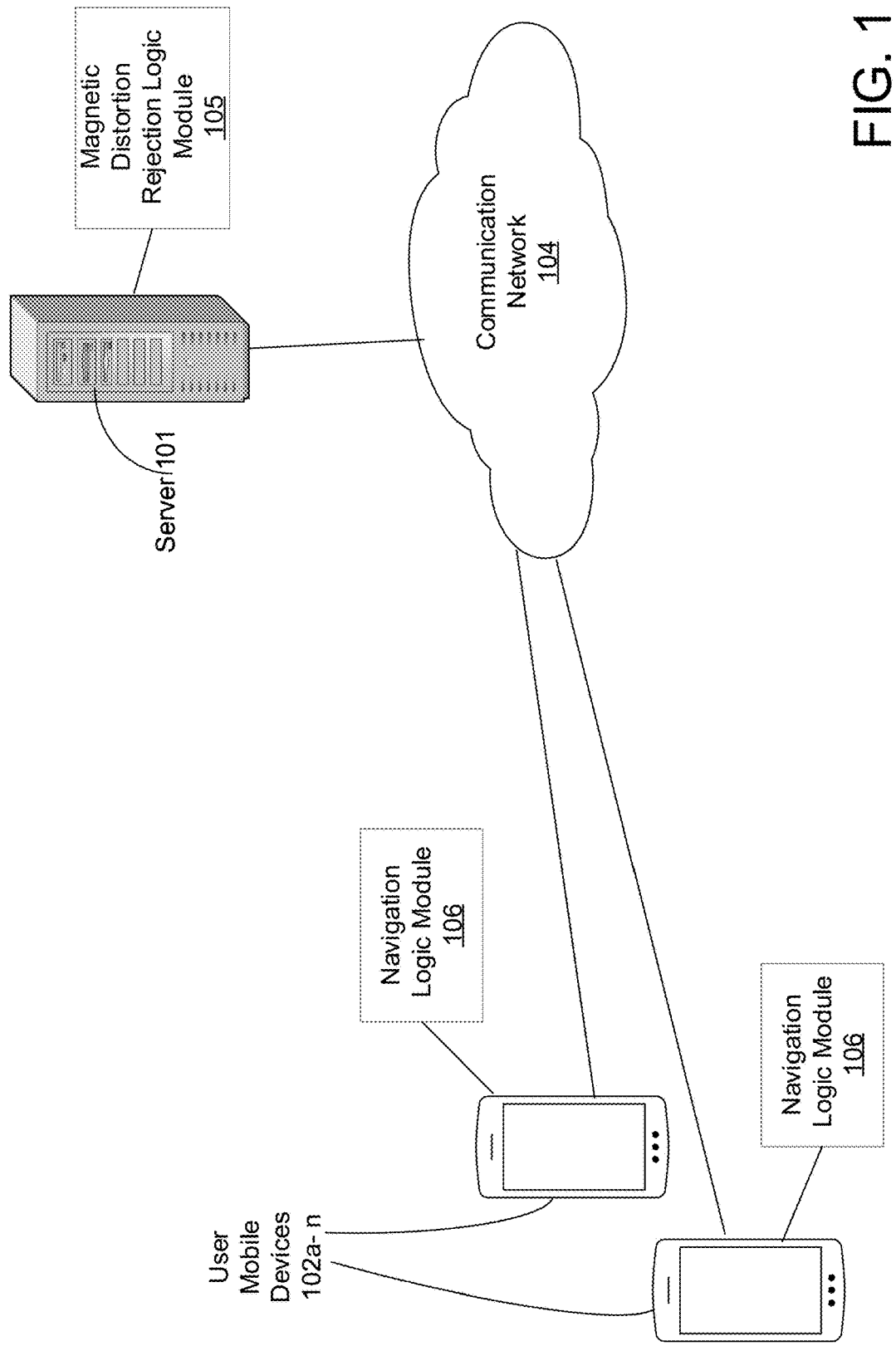
FIG. 1 illustrates, in an example embodiment, a system for generating and deploying a magnetic distortion rejection map of an indoor area.

Embodiments herein recognize that mobile devices used for indoor navigation must perform with a degree of accuracy and responsiveness that meets or exceeds user expectations. Among other technical effects and advantages, embodiments herein provide solutions which are directed to using indoor navigation solutions in a manner that enhances accuracy of positioning determination, referred to herein as localization, with accuracy and responsiveness in the presence of distortive or potentially distortive magnetic fields. Embodiments herein also recognize that, among the various data inputs to user indoor navigation and positioning, such as wireless signal data, inertial data, magnetic data, barometric, and optical line of sight data, magnetic field data acquired in the presence of a magnetic field may be sufficiently distortive to produce inaccurate mobile device localization results, unless existence of the distorting field is taken into consideration and accounted for.

Provided is a method of deploying a magnetic distortion rejection map of an indoor area. In particular, the method comprises generating, using a processor, (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points, receiving, at the memory, a set of magnetic fingerprint data that includes a second set of magnetic distortion data points based on an additional set of positions traversed by at least one additional mobile device within the indoor area, processing the second set of magnetic distortion data points, the first distribution and the second distribution to generate an updated distribution of magnetic distortion data points, and if the updated distribution exceeds a threshold density of magnetic distortion data points, deploying the updated distribution as the magnetic distortion rejection map of the area.

Also provided is a server computing system including a processor and a memory storing a set of instructions, the instructions executable in the processor to generate, using the processor, (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points, receive, at the memory, a set of magnetic fingerprint data that includes a second set of magnetic distortion data points based on an additional set of positions traversed by at least one additional mobile device within the indoor area, process, using the processor, the second set of magnetic distortion data points, the first distribution and the second distribution to generate an updated distribution of magnetic distortion data points, and if the updated distribution exceeds a threshold density of magnetic distortion data points, deploy the updated distribution as a magnetic distortion rejection map of the area.

The term fingerprint, also referred to herein as fingerprint data, in one embodiment constitutes time-stamped, time-correlated, individual measurements of any combination of received wireless communication signal strength information, magnetic field information (strength, direction) or barometric pressure information at known, fixed locations within an area, including an indoor area. In other words, a fingerprint includes a correlation of sensor and signal information (including, but not necessarily limited to wireless signal strength, magnetic or barometric information inertial sensor information) at a given instance in time, at a unique position along a sequence of positions that constitute a navigation path traversed by the mobile device. Additionally, given that sampling times and sampling rates applied to particular device sensors may be different, the signal and sensor information as measured may be time-averaged across particular periods of time, with the time-averaged value being used to represent the signal information at any given instance of time within that particular period of time in which the signal information is time-averaged.

In a crowd sourcing-based approach, users may be provided an indoor positioning mobile device application and may be encouraged to walk around the area of interest, such as an indoor shopping mall. At various known, fixed locations within the area, events, also referred to herein as occurrence events, may be triggered and logged. Based on the logged data, an offline estimation of the user trajectory may be determined, and corresponding to known fixed locations, fingerprint measurements may be correlated with respective indoor locations along a trajectory, or trajectory segments, along which a user's mobile device traverses while within the area. As more trajectories from numerous other users are accumulated and logged, the averaging of user results may be used to accomplish a fingerprint mapping of the area or region.

In particular, the crowd sourcing-based embodiments described here advantageously avoid the need for tedious and expensive specially-purposed, dedicated mapping of magnetic distortion regions of an indoor area and result in a more accurate map representation for mobile device localization and positioning purposes in a target environment. Users incentives, for example, may be offered, to encourage random mobile device users to participate using their mobile device indoor navigation application.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system for generating and deploying a magnetic distortion rejection map of an indoor area. Server 101, includes magnetic distortion rejection logic module 105, and is communicatively connected via communication network 104 to a plurality of computing and communication mobile devices 102a-n, also referred to herein as mobile device(s) 102a-n. Mobile devices 102a-n include navigation logic module 106, which in one embodiment, may be included in an indoor positioning, or indoor navigation, software application downloaded and installed at individual ones of mobile devices 102a-n.

Figure 2:
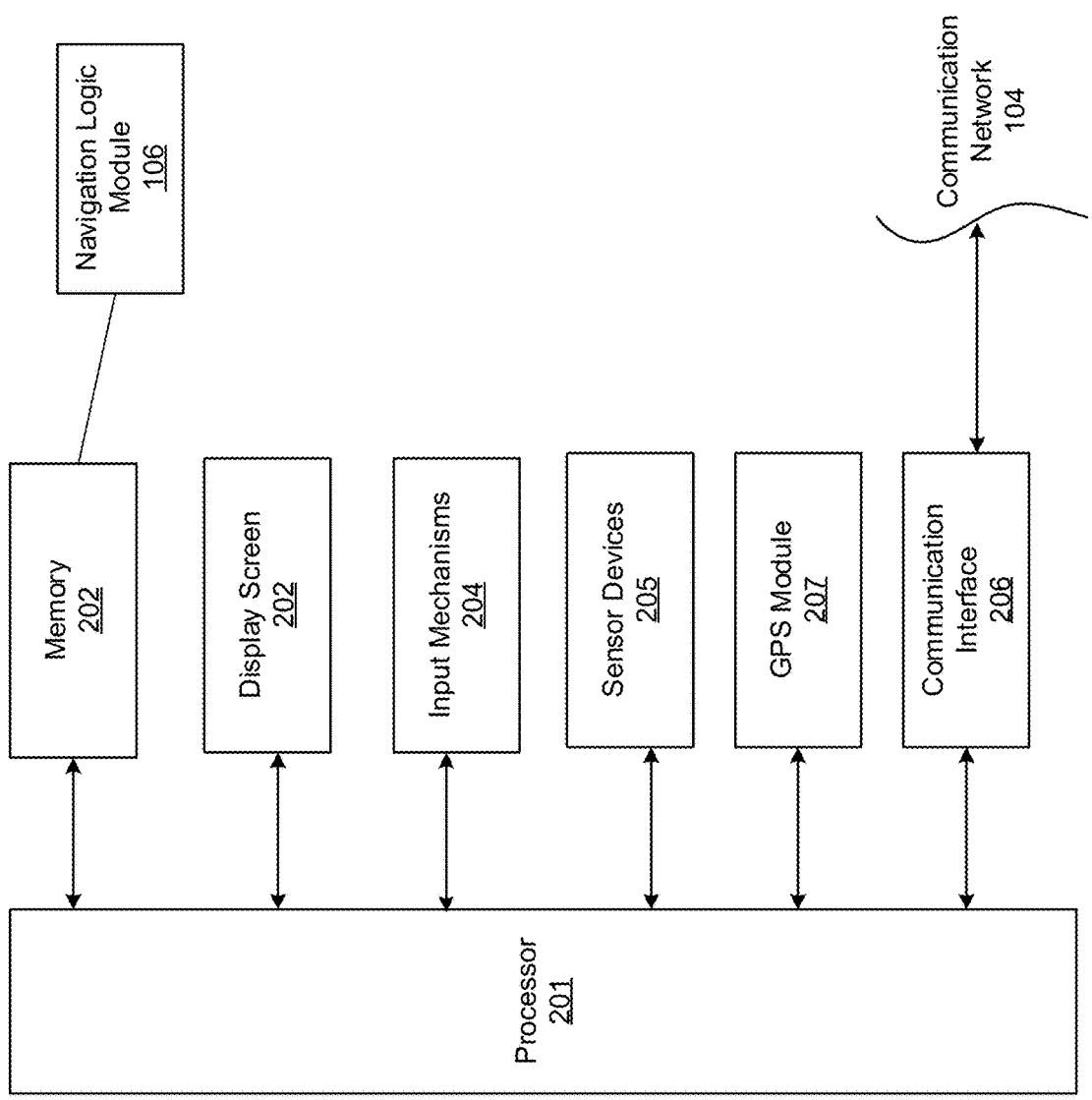
FIG. 2 illustrates an example architecture of a mobile computing device for crowd-sourced use in generating and deploying a magnetic distortion rejection map of an indoor area.

FIG. 2 illustrates an example architecture of a computing and communication mobile device 102, representative of a plurality of mobile devices 102a-n for acquisition of fingerprint data in conjunction with deploying a magnetic distortion rejection map for positions, locations or routes within the indoor area. As used herein, the term mobile device 102 refers to any singular mobile device among mobile devices 102a-n. In one embodiment, mobile device 102 may correspond to, for example, a cellular communication device (e.g., smartphone, tablet, etc.) that is capable of telephony, messaging, and/or data computing services. In variations, mobile device 102 can correspond to, for example, a tablet or a wearable computing device. Mobile device 102 may include processor 201, memory 202, display screen 203, input mechanisms 204 such as a keyboard or software-implemented touchscreen input functionality, barcode, QR code or other symbol- or code-scanner input functionality. Mobile device 102 may include global positioning system (GPS) module 207, with the GPS and cellular data acquired capable of providing particular locations of mobile device 102. Mobile device 102 may include sensor functionality by way of sensor devices 205. Sensor devices 205 may include any of inertial sensors (accelerometer, gyroscope), magnetometer or other magnetic field sensing functionality, and barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In particular, mobile device 102 may include location determination capability such as by way of GPS module 205, and communication interface 206 for communicatively coupling to communication network 104, such as by sending and receiving cellular data over data channels and voice channels.

Navigation logic module 106 includes instructions stored in memory 202 of mobile device 102. In embodiments, navigation logic module 106 may be included in a mobile device navigation application program stored in memory 202 of mobile device 102 for acquiring fingerprint data within an area by any of plurality of mobile devices 102a-n. The area may be an indoor area within a shopping mall, an airport, a warehouse, a university, or any at least partially enclosed building. Acquisition of the fingerprint data may be automatically triggered at respective ones of mobile devices 102a-n upon an event occurrence. The event occurrence may consist of a user of mobile device 102 redeeming a promotion coupon at a merchant within a shopping mall, scanning a barcode, using an RFID tag, or upon the mobile device 102 becoming present at specific predetermined locations within the area. The occurrence event may be also based on detecting a proximity beacon wireless signal, in some examples. Acquisition of the fingerprint data by a user's mobile device 102 may thus be automatically triggered upon the event occurrence at any one of a predetermined set of fixed positions within the area.

In this manner, a user of mobile device 102 may, in effect, passively assist in creating a magnetic distortion rejection map region by acquiring fingerprint data, then allowing uploading or other transfer of the acquired fingerprint data to server 101 for further processing whereupon a magnetic position correction factor may be applied. The position correction factor may represent the position as localized based on the prevailing magnetic distortion and a known position location, such as at a predetermined physical landmark, which represents a true position of the mobile device within the indoor area or building. The fingerprint data may be acquired at least in part using sensor devices 205 of the mobile devices, including but not limited to an accelerometer, a gyroscope, a magnetometer, a barometer, and a wireless signal strength sensor. The fingerprint data may include any one of orientation data, a magnetic field data including strength and direction, received wireless signal strength data, barometric pressure data, and also GPS location data at a position within the area for respective mobile devices.

As the fingerprint data acquired at mobile device 102 is time-stamped and the data collection via navigation logic module 106 operates in a distributed manner, the fingerprint data may be cached on the local memory 202 and subsequently batch transferred as a compressed data file for post-processing at server 101, in some embodiments. Navigation logic module 106, in effect, operates to pre-process fingerprint data and extract key features which can assist in the mobile device 102 trajectory reconstruction during the post processing step at server 101. The pre-processing step at navigation logic module 106 may include, in conjunction with inertial sensors including gyroscope and accelerometer of mobile device 102, counting the number of steps taken by a user of mobile device 102, estimating the step length of each step, estimating the heading direction for each step, as well as, recording the time-averaged and time-stamped magnetic field information and wireless radio signals, and monitoring for, and logging, occurrence of any triggered event/tag-based data that enables the trajectory of mobile device 102 to be best matched a physical map of the area that includes known fixed objects at unique locations.

FIG. 3 illustrates an example architecture of server computing device 101 for generating and deploying a magnetic distortion rejection map of an indoor area. Server 101, in an embodiment architecture, may be implemented on one or more server devices, and includes processor 301, memory 302 which may include a read-only memory (ROM) as well as a random access memory (RAM) or other dynamic storage device, display device 303, input mechanisms 304 and communication interface 309 for communicative coupling to communication network 104. Processor 301 is configured with software and/or other logic (such as from magnetic distortion rejection logic module 105) to perform one or more processes, steps and other functions described with implementations, such as described by FIGS. 1 through 4 herein. Processor 301 may process information and instructions stored in memory 302, such as provided by a random access memory (RAM) or other dynamic storage device, for storing information and instructions which are executable by processor 301. Memory 302 also may be used for storing temporary variables or other intermediate information during execution of instructions to be executed by processor 301. Memory 302 may also include the ROM or other static storage device for storing static information and instructions for processor 301; a storage device, such as a magnetic disk or optical disk, may be provided for storing information and instructions. Communication interface 309 enables server 101 to communicate with one or more communication networks 104 (e.g., cellular network) through use of the network link (wireless or wired). Using the network link, server 101 can communicate with computing devices 102a-n.

Magnetic distortion rejection logic module 105 of server 101 may include instructions stored in RAM of memory 302, and includes fingerprint data acquisition module 305, accumulative magnetic data module 306, magnetic data update module 307 and magnetic distortion rejection map deployment module 308.

Processor 301 uses executable instructions stored in magnetic fingerprint data acquisition module 305 to generate (i) a first distribution of magnetic fingerprint data that includes magnetic distortion data points based at least in part on a set of positions traversed by a plurality of mobile devices 102a-n within the indoor area, and (ii) based on accessing a position correction factor, a second distribution of magnetic fingerprint data that includes true position data points corresponding to the magnetic distortion data points. The area may be an indoor area within a shopping mall, an airport, a warehouse, a university, or any at least partially enclosed building. In embodiments, the fingerprint data, as acquired from mobile devices 102a-n, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors 205 are different, the signal and sensor information as measured may be time-averaged across particular periods of time, with the time-averaged value being used to represent the signal information at any given instance of time within that particular period of time in which the signal information is time-averaged.

Processor 301 uses executable instructions stored in accumulative magnetic data module 306 to receive a set of magnetic fingerprint data that includes a second set of magnetic distortion data points based on an additional set of positions traversed by at least one additional mobile device within the indoor area. The term "position" as used herein refers to a coordinate location and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms.

Processor 301 uses executable instructions stored in magnetic data update module 307 to processing the second set of magnetic distortion data points, the first distribution and the second distribution to generate an updated distribution of magnetic distortion data points.

Processor 301 uses executable instructions stored map deployment module 308 to, if the updated distribution exceeds a threshold density of magnetic distortion data points, deploy the updated distribution as the magnetic distortion rejection map of the area. In one embodiment, the threshold density for deployment may be dynamically determined, and dynamically updated. Dynamically updating the threshold density allows the system to automatically detect and correct potential calibration inconsistencies prior to deploying the magnetic distortion rejection map of the area. A density determination algorithm may be applied, in one embodiment, to establish the predetermined threshold density based on validating the distribution of data points as sufficient for deployment.

A density determination algorithm may be applied, in one embodiment, to establish the predetermined threshold density based on validating the distribution of data points as sufficient for deployment, representing the magnetic distortion rejection map of the area. In another embodiment, the threshold density for deployment may be dynamically determined, and dynamically updated, based on updating at least one of the density of calibration data points and the consistency amongst the calibration data points relative to a neighboring area contiguous with the target area. Dynamically updating the threshold density in the latter manner allows the system to automatically detect and correct potential calibration inconsistencies prior to deploying the calibrated positioning map of the area. The density determination algorithm may be employed in conjunction with an artificial neural network to validate when a sufficient number of fingerprint and GPS positioning data points have been collected and accumulated for specific areas or regions within the areas. In particular, this process can also assist in identifying pedestrian traffic patterns and traffic densities for particular areas and times within the area or the shopping mall, as well as to provide the capability to assess whether or not a sufficient amount of data has been collected to complete the magnetic distortion rejection map deployment process. In the present embodiment, the one-time artificial neural network processing initializes the fingerprint data. Moreover, based on the artificial neural network processing, a dynamic incremental fingerprint updating scheme may be employed to dynamically maintain up-to-date fingerprint calibration data sets.

Methodology

FIG. 4 illustrates, in an example embodiment, a method 400 of operation in deploying a magnetic distortion rejection map of an indoor area. In describing examples of FIG. 4, reference is made to the examples of FIGS. 1-3 for purposes of illustrating suitable components or elements for performing a step or sub-step being described.

Examples of method steps described herein relate to use of server 101 for implementing the techniques described herein. According to one embodiment, the techniques are performed by magnetic distortion rejection logic module 105 of server 101 in response to the processor 301 executing one or more sequences of software logic instructions that constitute magnetic distortion rejection logic module 105. In embodiments, magnetic distortion rejection logic module 105 may include the one or more sequences of instructions within sub-modules including fingerprint data acquisition module 305, accumulative magnetic data module 306 and magnetic data update module 307. Such instructions may be read into memory 302 from machine-readable medium, such as memory storage devices. Execution of the sequences of instructions contained in fingerprint data acquisition module 305, accumulative magnetic data module 306 and magnetic data update module 307 of magnetic distortion rejection logic module 105 in memory 302 causes processor 301 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 410, using the executable instructions of magnetic fingerprint data acquisition module 305, receiving, generating, using the processor 301 (i) a first distribution of magnetic fingerprint data that includes magnetic distortion data points based at least in part on a set of positions traversed by a plurality of mobile devices 101a-n within the indoor area, and (ii) based on accessing a position correction factor, a second distribution of magnetic fingerprint data that includes true position data points corresponding to the magnetic distortion data points. The area may be an indoor area within a shopping mall, an airport, a warehouse, a university, or any at least partially enclosed building. Acquisition of the first and second sets of fingerprint data may be automatically triggered at respective mobile devices upon an event occurrence. The event occurrence may consist of a user redeeming a coupon at a merchant within a shopping mall, scanning a barcode, using an RFID tag, or may be based on accessibility of a proximity beacon wireless signal, in some examples. Acquisition of the fingerprint data by a user's mobile device may thus be automatically triggered upon the event occurrence at any one of a predetermined set of fixed positions within the area. In this manner, users of mobile device 102 may, in effect, passively assist by crowdsourcing in the by acquiring fingerprint data, then allowing uploading or other transfer of the acquired fingerprint data to server 101 for further processing. The fingerprint data may be acquired using sensor devices 205 of the mobile devices, including but not limited to an accelerometer, a gyroscope, a magnetometer, a barometer, and a wireless signal strength sensor, in conjunction with GPS positioning data using GPS module 107. The fingerprint data may include any one or more of an orientation, a magnetic field strength and direction, a received wireless signal strength, a barometric pressure, and an optical line of sight data at a position within the area for respective mobile devices.

In embodiments, the fingerprint data, as acquired from the mobile devices, further includes respective time-stamps, whereby the orientation and other inertial sensor data, the magnetic field strength and direction, the received wireless signal strength, the barometric pressure, and the position data can be time-correlated in accordance with the time-stamps with respect to any given position along a sequence of positions describing a trajectory or trajectory segment of the mobile devices 101a-n. Additionally, given that sampling times and sampling rates applied to particular ones of device sensors 205 may be different, the signal and sensor information as measured may be time-averaged across particular periods of time, with the time-averaged value being used to represent the signal information at any given instance of time within that particular period of time in which the signal information is time-averaged.

In one embodiment, the position correction factor is accessed from a mobile device localization fingerprint database accessible to the processor 301 of server device 101. The true position data points, in one example, may be based on a set of physical landmarks having respective predetermined or known coordinate positions within the indoor area.

In an embodiment, the position correction factor may be established or calculated as a difference between the magnetic distortion data points and the true position data points at respective positions within the indoor area.

At step 420, using the executable instructions of accumulative magnetic data update module 306, receiving, at memory 302 of the server computing device 101, a set of magnetic fingerprint data that includes a second set of magnetic distortion data points based on an additional set of positions traversed by at least one additional mobile device within the indoor area. The terms position or positioning as used herein refers to a coordinate location and may be expressed in local or global (X, Y, Z) coordinate terms.

At step 430, using the executable instructions of magnetic data update module 307, processing, using the processor 301, the second set of magnetic distortion data points, the first distribution and the second distribution to generate an updated distribution of magnetic distortion data points At step 440, using the executable instructions of map deployment module 308, if the updated distribution exceeds a threshold density of magnetic distortion data points, deploying the updated distribution as the magnetic distortion rejection map of the area. In one embodiment, the threshold density for deployment may be dynamically determined, and dynamically updated. Dynamically updating the threshold density allows the system to automatically detect and correct potential calibration inconsistencies prior to deploying the magnetic distortion rejection map of the area. A density determination algorithm may be applied, in one embodiment, to establish the predetermined threshold density based on validating the distribution of data points as sufficient for deployment.

In some embodiments, the indoor area may include one of a shopping mall, an airport, a warehouse, a campus building and an at least partially enclosed building.

The acquisition of the sets of fingerprint data may be automatically triggered at the at least one mobile device upon an event occurrence, the event occurrence comprising at least one of redeeming a coupon, scanning a barcode, and using an RFID tag.

The fingerprint data may include at least two of wireless signal data, inertial data, magnetic data, barometric data and optical data that are time-stamped and time-correlated for respective positions in the sequence of positions.

A density determination algorithm may be applied to establish a predetermined threshold density as sufficient for deploying as the magnetic distortion rejection map of the indoor area.

The threshold density of positioning data points may be dynamically updated in conjunction with an artificial neural network to validate when a sufficient number of positioning data points have been accumulated for at least a portion of the indoor area.

In one embodiment, an outer boundary may be described or defined based on the distribution of magnetic distortion data points, for instance an outer boundary that circumscribes the updated distribution of positioning data points as a magnetic distortion rejection sub-area within the indoor area, in one variation.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature.

Thus, the absence of describing combinations should not preclude the inventor from claiming rights to such combinations.

What is claimed is:

1. A method for deploying a magnetic distortion rejection map of an indoor area, the method executed in a processor of a server computing device and comprising:
   generating, using the processor, (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points;
   receiving, at a memory of the server computing device, a set of magnetic fingerprint data that includes a second set of magnetic distortion data points based on an additional set of positions traversed by at least one additional mobile device within the indoor area;
   processing, using the processor, the second set of magnetic distortion data points, the first distribution and the second distribution to generate an updated distribution of magnetic distortion data points; and
   if the updated distribution exceeds a threshold density of magnetic distortion data points, deploying the updated distribution as the magnetic distortion rejection map of the area.

2. The method of claim 1 wherein the indoor area comprises one of a shopping mall, an airport, a warehouse, a campus building and an at least partially enclosed building.

3. The method of claim 1 wherein acquisition of the first and second distributions of magnetic data points are automatically triggered at the at least one mobile device upon an event occurrence that includes at least one of redeeming a coupon, scanning a barcode, and using an RFID tag.

4. The method of claim 1 wherein the magnetic fingerprint data includes magnetometer sensor data that is time-stamped and time-correlated for respective positions within the indoor area.

5. The method of claim 1 wherein the position correction factor is accessed from a mobile device localization fingerprint database accessible to the processor.

6. The method of claim 5 wherein the true position data points are based on a set of physical landmarks having respective predetermined positions within the indoor area.

7. The method of claim 6 wherein the position correction factor comprises a difference between the magnetic distortion data points and the true position data points at respective positions within the indoor area.

8. The method of claim 1 wherein a density determination algorithm establishes the predetermined threshold density as sufficient for deploying as the magnetic distortion rejection map of the indoor area.

9. The method of claim 1 wherein the threshold density of magnetic distortion data points is dynamically updated in conjunction with an artificial neural network.

10. The method of claim 1 further comprising defining an outer boundary that includes the updated distribution of positioning data points as a magnetic distortion rejection boundary.

11. A server computing system comprising:
    a processor;

a memory storing a set of instructions, the instructions executable in the processor to:

generate, using the processor, (i) a first distribution of magnetic fingerprint data that includes magnetic distortion data points based at least in part on a set of positions traversed by a plurality of mobile devices within the indoor area, and (ii) based on accessing a position correction factor, a second distribution of magnetic fingerprint data that includes true position data points corresponding to the magnetic distortion data points;

receive, at the memory, a set of magnetic fingerprint data that includes a second set of magnetic distortion data points based on an additional set of positions traversed by at least one additional mobile device within the indoor area;

process, using the processor, the second set of magnetic distortion data points, the first distribution and the second distribution to generate an updated distribution of magnetic distortion data points; and if the updated distribution exceeds a threshold density of magnetic distortion data points, deploy the updated distribution as a magnetic distortion rejection map of the area.

12. The server computing system of claim 11 wherein the indoor area comprises one of a shopping mall, an airport, a warehouse, a campus building and an at least partially enclosed building.

13. The server computing system of claim 11 wherein acquisition of the first and second distributions of magnetic data points are automatically triggered at the at least one mobile device upon an event occurrence that includes at least one of redeeming a coupon, scanning a barcode, and using an RFID tag.

14. The server computing system of claim 11 wherein the magnetic fingerprint data includes magnetometer sensor data that is time-stamped and time-correlated for respective positions within the indoor area.

15. The server computing system of claim 11 wherein the position correction factor is accessed from a mobile device localization fingerprint database accessible to the processor.

16. The server computing system of claim 15 wherein the true position data points are based on a set of physical landmarks having respective predetermined positions within the indoor area.

17. The server computing system of claim 16 wherein the position correction factor comprises a difference between the magnetic distortion data points and the true position data points at respective positions within the indoor area.

18. The server computing system of claim 11 wherein a density determination algorithm establishes the predetermined threshold density as sufficient for deploying as the magnetic distortion rejection map of the indoor area.

19. The server computing system of claim 11 wherein the threshold density of magnetic distortion data points is dynamically updated in conjunction with an artificial neural network.

20. The server computing system of claim 11 further comprising instructions executable to define an outer boundary that includes the updated distribution of positioning data points as a magnetic distortion rejection boundary.

* * * * *